Aug. 30, 1966    D. F. RECK    3,268,978
TOOL HOLDER

Filed March 31, 1965    2 Sheets-Sheet 1

INVENTOR.
DONALD F. RECK
BY
ATTORNEYS

Aug. 30, 1966    D. F. RECK    3,268,978

TOOL HOLDER

Filed March 31, 1965    2 Sheets-Sheet 2

INVENTOR.
DONALD F. RECK
BY
ATTORNEYS ial rim of the insert tip. This is more clearly shown in FIG. 7.

United States Patent Office
3,268,978
Patented August 30, 1966

3,268,978
TOOL HOLDER
Donald F. Reck, 1985 Belmont Drive, Muskegon, Mich.
Filed Mar. 31, 1965, Ser. No. 444,184
11 Claims. (Cl. 29—96)

This invention relates to a machining tool and more particularly to a novel tool holder and a combination tool holder and insert tool tip.

Figure 4:
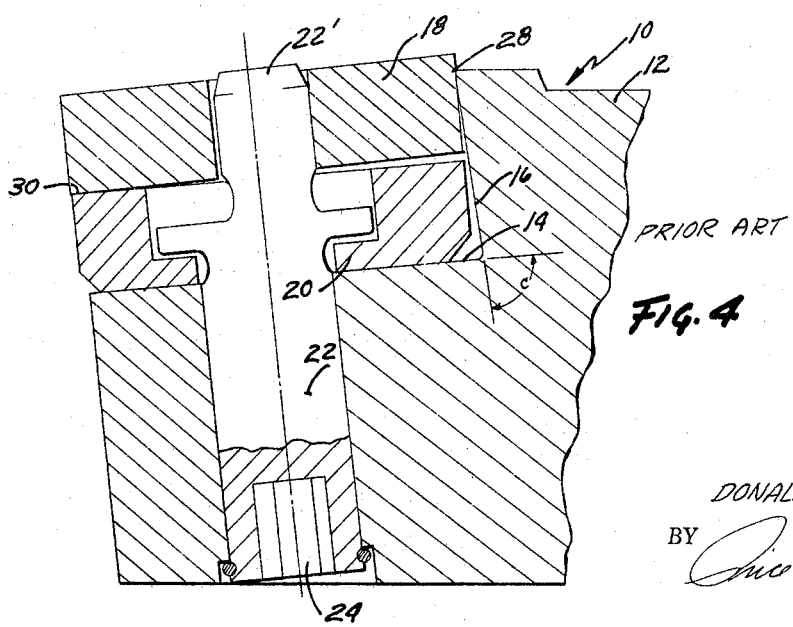

A variety of tool holders for receiving replaceable and indexable tip inserts have been proposed heretofore, with one of the best employing an eccentric type locking action, for example as taught in General Electric Patent No. 3,097,417 for negative rake angle inserts. The effectiveness of the insert is directly related to its mounting characteristics. The insert in this rotatable eccentric type construction must have particular abutting relationships with respect to the tool holder in order to be operable. More specifically, it has been found necessary that the tool holder for the negative rake angle insert have a sharp edge to project into the peripheral face of the insert, in order to provide stable insert mounting. These type tools are presently necessarily limited to inserts having a negative rake angle as shown in FIG. 4. The rake angle is of course that angle of the upper tip surface with respect to the horizontal plane. If the eccentric cam were used with an indexable tip at a positive rake angle, using prior teachings and tool holder constructions, proper clamping could not be achieved because of the ineffective cooperation of the peripheral face of the positive rake angle tool insert which must have a clearance angle. More specifically, a positive rake insert tip would not clamp properly because the top edge would just climb up onto the holder shank and fail to clamp at all. This factor, explained more specifically hereinafter, has the consequence of making the simple and otherwise effective eccentric camming locking principle presently unsuitable for positive rake angle tip inserts. While there have been other types of tool holders proposed which will handle positive rake angle tip inserts, these are complex, expensive, and/or largely ineffective.

Also, although some insert tool units using top clamping means are capable of retaining an adjustable, replaceable chip breaker, the eccentric type has not been capable heretofore.

It is an object of this invention to provide a novel, practical tool holder employing the eccentric cam locking action, and capable of effectively retaining an insert tip at a positive rake angle.

Another object of this invention is to provide a novel tool holder and an indexable, multiple cutting edge, insert tip combination having unique mounting coaction achieving excellent cutting action at any one of the indexed positions while also enabling positive rake angle orientation.

Still another object of this invention is to provide an eccentric locking type tool holder that retains an insert tip and also a chip breaker. The device achieves stability, cutting effectiveness, and indexability of the insert tip. The combination mounts in a simple, yet stable manner, for operation in any of several indexed positions.

Figure 1:
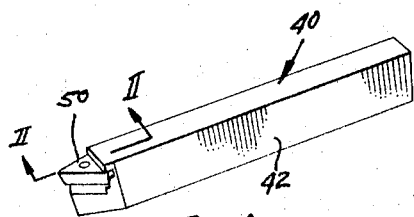
Figure 2:
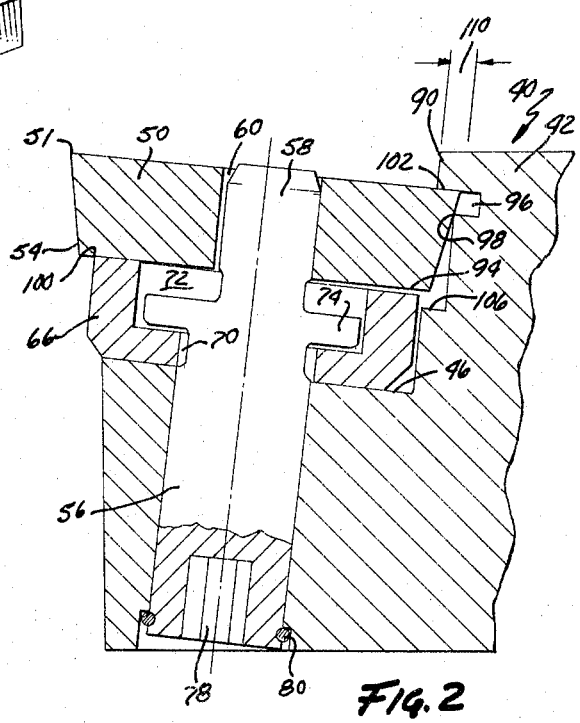
Figure 3:
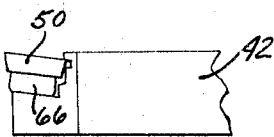
Figure 5:
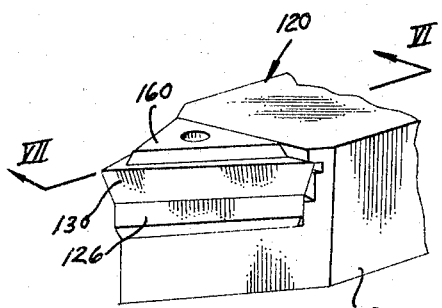
Figure 7:
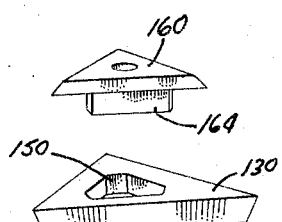
Figure 8:
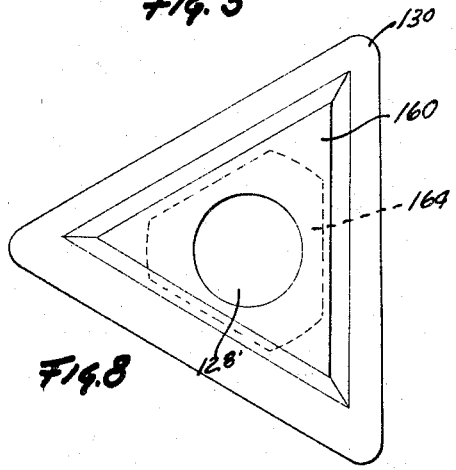
Figure 6:
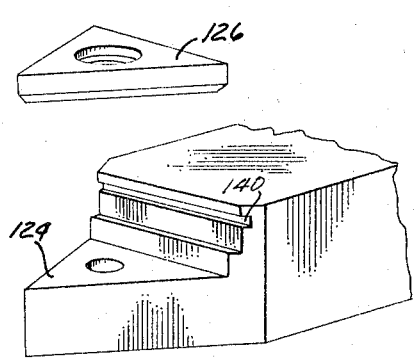
Figure 6:
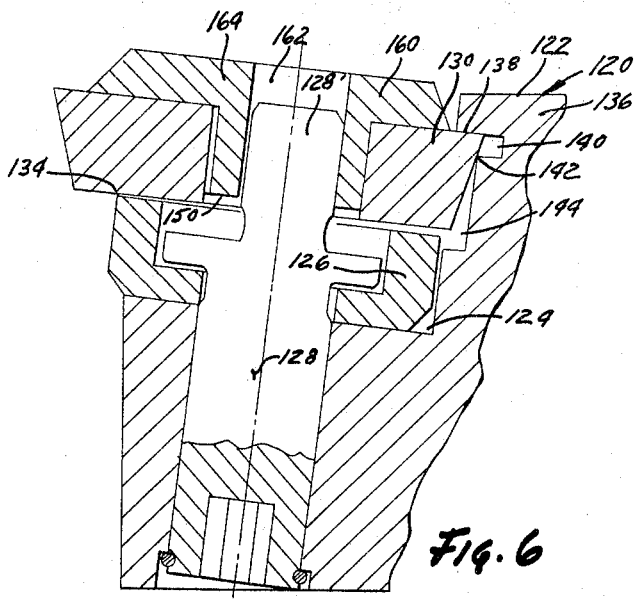

These and several other objects of this invention will become apparent upon studying the following specification in conjunction with the drawings in which:

FIG. 1 is a perspective view of a tool of the invention;
FIG. 2 is a fragmentary, enlarged, sectional view of the tool in FIG. 1 taken on plane II—II;
FIG. 3 is a side elevational view of the tool in FIGS. 1 and 2;
FIG. 4 is a sectional view showing prior art teachings;
FIG. 5 is a fragmentary perspective view of a modified form of the structure of the invention;
FIG. 6 is a sectional view of the apparatus in FIG. 5 taken on plane VI—VI;
FIG. 7 is an exploded perspective view of the apparatus in FIGS. 5 and 6; and
FIG. 8 is a top plan view of the cutting portion of the apparatus in FIGS. 5 through 7.

Referring now specifically to the drawings, the prior art tool structure 10 shown in FIG. 4 has a shank 12 that is elongated, and has a recess in its front end. This recess has a ledge 14 and a back wall 16. According to prior teachings, an insert tip 18 is retained as on a tip seat 20, both being secured on ledge 14 against back wall 16 by the use of a rotatable binding element 22 having an eccentric upper end 22' which pushes insert 18 against back wall 16 to bind the assembly. Rotation is by an Allen wrench in socket 24. When the insert is clamped in place on the tool holder, the rotatable cam presses it into contact at point 28. Since angle C is less than 90°, purposely, pressure at contact point 28 forces the insert to rotate very minutely counterclockwise to force the cutting edge downward to make a firm contact against the seat at point 30. This causes good rigidity at the cutting edge. However, this construction is limited to negative rake angle cutting tool inserts which, although useful in many applications, are not satisfactory for many applications where a positive rake tool with its free cutting action is necessary.

A definite problem occurs, however, with the adaptation of indexable, positive rake inserts to this rotatable camming locking action, since the positive rake insert must have a clearance angle around the periphery of the indexable insert adjacent each of the plurality of cutting edges. More specifically, referring to FIG. 2, insert 50 on shank 42 of this combination tool 40 must have a clearance angle S on the peripheral face 54 of the tool. The insert tapers downwardly and inwardly, from the upper peripheral cutting edge, toward the center of the insert.

In this illustrated form of the invention, this insert is shown as triangular in configuration. It will be understood that this may be of some other polygonal construction such as square, or can even be round in some instances. The teachings given herein with respect to the triangular construction are therefore applicable also to these others, but they are not shown in addition since this would merely be superfluous. Of course the ledge shape of the tool holder will be of corresponding configuration. Referring to FIG. 2 and the positive rake angle insert 50 shown there, it will be understood that if this insert were used in the prior construction shown in FIG. 4, the peripheral face 54 of the insert would contact point 28 on the prior art shank, but would not cause a binding action there to secure the insert in place. Rather, the insert would merely climb upon the edge and would fail to clamp.

The inventor herein, realizing this and the reason therefore, developed the novel construction shown in FIG. 2 to overcome this. In this novel assembly 40, the ledge 46 is formed at an upward slope outwardly toward the end so that the tip mounted thereon is at a positive rake angle. The locking mechanism for this form includes the same type of rotatable locking element 56 with a cylindrical bottom and an eccentric upper end 58 inside insert opening 60 in the center of insert 50. On ledge 46 beneath the bottom of insert 50 is a seat element 66 which has an upper annular seat for the insert tip. The center of this seat element includes a lower opening 70 of smaller diameter to receive the locking element, and an upper opening 72 of larger diameter to receive the peripheral annular flange 74 on the locking element. The lower end of the locking element has a hexagonal socket 78 to allow rotation thereof with an Allen wrench. The entire locking unit is retained in the holder by a spring element 80.

The back wall portion of the holder, which projects upwardly from ledge 46 of the shank recess, includes a specially formed relief, shoulder, and projection. More specifically, the back wall portion includes a forwardly projecting, overlying protrusion or projection 90 which extends out over the upper face of insert 50 when eccentric element 58 is rotated to clamp the insert against the rear wall portion. This projection has special significance, since it retains the insert tip from uncontrollably rotating in a counterclockwise direction, especially when cutting pressure is applied to the outer cutting edge at 51 which overlies seat element 66 and the forward portion of the shank. It will be noted however, that the clearance between the bottom surface of this projection and the upper back surface of seat element 66 is greater than the thickness of insert element 50 itself, to effect a slight clearance 94 between the seat and the back portion of the tip for optimum cutting action and stability. This assures good point contact between the front bottom edge of the tip and the front edge of the seat.

Immediately beneath this projection 90 is a cut-out relief 96 formed into the wall portion so that the outwardly projecting upper cutting edge of the insert will not be damaged by being pressed against the back wall portion. The relief 96 not only enables a sharp edge of the cutting tip to be held in good condition, but also allows room for chip debris which may be accumulated on a used edge. Contact on the back part of the peripheral face 54 of this insert is made between a sharp shoulder edge 98 immediately adjacent the lower portion of this relief and the peripheral insert face. Hence, contact of the insert is made on three points, namely, front contact point 100 against the front upper edge of seat element 66, shoulder contact 98 against the back peripheral edge of the insert below the cutting edge, and point 102 at the outer portion of the upper face of the insert against the bottom side of projection 90. The contact pressure of the insert is horizontally at point 98 and vertically at the underlying surface at point 102. It has been found that this effects the greatest stability, with good rigidity at the cutting edge.

It will also be noted that the back wall is stepped at 106 to provide the necessary clearance for insert element 50 which is of a larger diameter than the underlying seat element 66.

The amount of extension of projection 90 over the insert, and specifically distance 110 between the main back wall portion and the outer end of the projection, is purposely made less than the shifting distance of the eccentric upper end 58 of the cam lock element so that, when the cam lock is released by rotating it to the opposite direction, the insert can be neatly lifted vertically off the seat.

With this novel construction, the eccentric type binding action (to lock the insert) can be utilized with a positive rake angle of an indexable tip insert having a plurality of cutting edges around its periphery. As indicated previously, this triangular tip has three cutting edges around its periphery, but if it is of some other polygonal configuration, it would have a corresponding number of polygonal cutting edges. Each cutting edge portion is used independently until it becomes dull. Then, by rotation of the cam lock, the insert can be removed vertically, is rotated the angle necessary to place the next unused cutting edge in overhanging relation to the seat and ledge, is replaced, and the eccentric cam is then rotated to relock the assembly.

In FIGS. 5 through 8 is shown a modified form of the apparatus, using a chip breaker in addition to the positive rake angle insert construction.

More specifically, referring to FIGS. 5 through 8, tool assembly 120 includes a shank element 122 having a recess on one end forming a lower ledge 124 and a back wall portion similar to that just described. On this ledge is a seat element 126 with a central opening that receives the upper end of the rotatable cam lock element 128 in similar fashion to that already described. Upon the seat element is mounted an insert tip 130 that contacts seat element 126 at front outer point 134, contacts the underside of overlying projection 136 at point 138, and contacts the shoulder beneath relief 140 at 142. As previously, a clearance 144 is maintained between the back or rear portion of seat element 126 and insert 130 to assure a firm contact at point 134 along the front edge.

Opening 150 in the center of insert 130 is different from the first form shown. It is substantially larger than the diameter of eccentric upper end 128' of locking element 128. Positioned on top of insert 130 is a chip breaker element 160. This chip breaker has a width and breadth substantially less than that of the insert in order to be recessed from its peripheral cutting edge. The chip breaker has a central, annular, downwardly protruding sleeve type shank 164 that has an outside diameter slightly smaller than opening 150 in insert 130. An orifice 162 extends through the chip breaker and its shank, and is substantially the same size as, but slightly larger than the size of the upper end of locking element 128'.

The sleeve type portion 164 of the chip breaker has a polygonal configuration like that illustrated in FIG. 8, as does opening 150 in the insert tip itself. The shaped opening in the insert causes the chip breaker to also be indexable as well as the insert. It allows control of the chip breaker positioning so that its configuration can correspond generally to that of the insert itself. If the chip breaker and insert tool are square therefore, the sleeve and opening in the insert can be generally square rather than generally triangular or three lobed as shown in FIG. 8 for the triangular insert and chip breaker. At any rate, the shape of the hole in the insert, and the shape of the sleeve type shank on the chip breaker must correspond to cause proper alignment of the chip breaker with the insert. The eccentric element, when rotated, binds sleeve portion 164 of the chip breaker against the rear of insert 130, which in turn is pressed tightly against shoulder 142 and beneath projection 130 of the shank to lock the assembly together.

A chip breaker of this design has another important advantageous feature. Specifically, each of its plurality of edges can have a different spacing from the edge of the cutting insert. Therefore, by rotating the chip breaker controlled amounts, it becomes adjustable to change the width of the breaker area for creating a "tighter" or "looser" chip for proper chip control and selection. Thus, the chip breaker, if triangular for example, can have one, two or three chip breaker widths along its edges.

With this construction, not only can the positive rake angle insert be used therefore, but the function of a typical chip breaker can be achieved to break up the chips as they are cut from the machined stock.

Various additional advantages and various minor structural changes in the particular tool shown can be made without departing from the unique concept presented. Therefore, it is intended that this invention is to be limited only by the scope of the appended claims and the reasonably equivalent structures to those defined therein.

I claim:

1. A machining tool comprising: a tool holder having an elongated shank and an insert-receiving recess on one end thereof; said recess having a bottom support ledge and a back wall portion; an indexable tip insert in said recess with a cutting edge overhanging said ledge, and having a rear edge at said wall portion; eccentric, rotatable locking means supported in said shank and projecting up through said ledge and into said tip insert, to lock said insert against said wall portion in said recess; and said shank having a projection protruding from said wall portion into hold-down relation with the rear edge of said tip insert, to limit rotation of said tip insert with respect to said wall portion.

2. A machining tool comprising: a tool holder having an elongated shank and an insert-receiving recess on one end thereof; said recess having a bottom support ledge and a back wall portion; an indexable tip insert in said recess with a cutting edge overhanging said ledge and having its rear portion at said wall portion; said insert having a positive rake angle when on said ledge, and including a clearance angle around its periphery; an eccentric, rotatable, insert locking means supported in said shank and projecting up through said ledge and into said insert to lock said insert against said wall portion in said recess; said shank having a projection protruding from said wall portion into holddown relation over the top of the rear portion of said tip insert; a cut-out relief beneath said projection to receive the adjacent upper peripheral cutting edge of said insert; and a shoulder along the lower edge of said relief abutting the back peripheral face of said insert.

3. A machining tool comprising: a tool holder having an elongated shank and an insert-receiving recess on one end thereof; said recess having a bottom support ledge and a back wall portion; an indexable tip insert in said recess with a cutting edge overhanging said ledge and having its rear portion at said wall portion; an eccentric, rotatable, insert locking means supported in said shank and projecting up through said ledge and into said insert to lock said insert against said wall portion in said recess; said shank having a projection protruding from said wall portion into hold-down relation with the rear of said tip insert; and said projection being positioned to cause slight raising of the rear portion of said insert with locking of said insert by said locking means, to form a slight clearance beneath said rear portion, and assure a firm contact beneath the front portion of said insert.

4. A machining tool comprising: a tool holder shank having a recessed ledge on one end and a wall portion therebehind; a rotatable eccentric locking element extending up through said ledge, spaced from said wall portion; an insert seat element on said ledge, fitting around said locking element; an insert tip on said seat element, and fitting around said locking element, one edge of said insert projecting out over said ledge and seat element for cutting; said ledge, seat, and insert having a positive rake angle with respect to said shank; said insert tip having a plurality of cutting edges around its periphery and a peripheral clearance angle from the upper cutting edge portion down, to have an inwardly tapered peripheral face; said back wall portion having a forwardly projecting means out over the rear edge of said insert, with the spacing from the lower side of said projecting means to the top of said seat element being slightly greater than the thickness of said insert tip to cause a slight gap between said seat and the rear edge of said insert tip adjacent said wall portion; and engagement means between said insert and said wall portion forcing the rear edge of said insert away from said seat element and up against said projecting means with locking of said locking element.

5. A machining tool comprising: a tool holder shank having a recess ledge on one end and a wall portion therebehind; a rotatable eccentric lock element extending up through said ledge, spaced from said wall portion; an insert seat on said ledge; an insert tip on said seat, one edge of said insert projecting out over said ledge and seat for cutting; said ledge, seat, and insert having a positive rake angle with respect to said shank; said insert tip having a plurality of cutting edges around its periphery, and a peripheral clearance angle from the upper cutting edge portion down, to have an inwardly downwardly tapered peripheral face; said back wall having a forwardly projecting portion out over the rear edge of said insert; with the spacing fom the lower side of said projecting portion to the top of said seat being slightly greater than the thickness of said insert tip, to allow a slight gap between said seat and the rear of said insert tip adjacent said wall portion; a cut-out relief into said wall portion immediately beneath said projecting portion to receive the upper cutting edge at the back of said insert; and a shoulder along the lower edge of said relief to abut the back peripheral face of said insert in a manner forcing said insert into contact with said projecting portion, thereby providing three point contact for said insert, on its forward bottom surface, on its back peripheral face, and on the back of its upper face.

6. A machining tool comprising: a tool holder shank having a recess in the end thereof, an insert seat in said recess, and a back wall portion; an insert tip on said seat in said recess; a rotatable eccentric binding means projecting up into said recess and having an upper eccentric end; said insert having an opening substantially larger than said upper end; a chip breaker on said insert, smaller in width and breadth than said insert, having a lower projection configurated and dimensioned to fit into said insert opening, and having a central orifice receiving said eccentric end to cause said chip breaker to bind against said insert and said insert to bind against said back wall portion with rotation of said binding means.

7. A machining tool comprising: a tool holder shank having a recess in the end thereof, an insert seat in said recess, and a back wall portion; an insert tip on said seat in said recess; a rotatable eccentric projecting up into said recess and having an upper eccentric end; said insert having an opening substantially larger than said upper end; a chip breaker on said insert, smaller in width and breadth than said insert, and having a lower projection configurated and dimensioned to fit into said insert opening; said chip breaker having a central orifice receiving said eccentric end, to cause said chip breaker to bind against said insert and said insert to bind against said back wall portion with rotation of said eccentric; and said shank having a projection protruding from said wall portion into hold-down relation with the rear of said tip insert.

8. A machining tool comprising: a tool holder shank having a recessed ledge on one end and a wall portion therebehind; a rotatable binding element extending up through said ledge, spaced from said wall portion and having an eccentric upper end; an insert seat on said ledge around said element; an insert tip on said seat and around said element, having a plurality of adjacent cutting edges around its periphery; one edge of said insert projecting out over said ledge and seat for cutting; said insert having an opening substantially larger than said upper end; a chip breaker on said insert, being smaller in width and breadth than said insert, having a lower projection configurated and dimensioned to fit into said insert opening, and having a central orifice receiving said eccentric upper end, to cause said chip breaker to bind against said insert and said insert to bind against said back wall portion with rotation of said binding element; said ledge, seat, and insert having a positive rake angle with respect to said shank; said insert tip having a peripheral clearance angle from the upper cutting edges down, to have an inwardly tapered peripheral face; and said back wall having a forwardly projecting portion out over the rear edge of said insert, with the spacing from the lower side of said projecting portion to the top of said seat being slightly greater than the thickness of said insert tip to allow a slight gap between said seat and the rear edge of said insert tip adjacent said wall portion.

9. A machining tool comprising: a tool holder shank having a recessed ledge on one end and a wall portion therebehind; a rotatable eccentric lock element with an upper end extending up through said ledge spaced from said wall portion; an insert seat on said ledge around said element; an insert tip on said seat and around said element, one edge of said insert projecting out over said ledge and seat for cutting; said insert having an opening substantially larger than said upper end; a chip breaker on said insert, being smaller in width and breadth than said insert, having a lower projection configurated and dimensioned to fit into said insert opening, and having a central orifice receiving said eccentric end, to cause said chip breaker to bind against said insert and said insert to bind against said back wall portion with rotation of said lock; said ledge, seat, and insert having a positive rake angle with respect to said shank; said insert tip having a plurality of cutting edges around its periphery, and a peripheral clearance angle from the upper cutting edges down, to have an inwardly tapered peripheral face; said back wall having a forwardly projecting portion out over the rear portion of said insert, with the spacing from the lower side of said projecting portion to the top of said seat being slightly greater than the thickness of said insert tip to allow a slight gap between said seat and the rear portion of said insert tip adjacent said wall portion; a cut-out relief into said wall portion immediately beneath said projecting portion to receive the upper peripheral cutting edge of said insert; and a shoulder along the lower edge of said relief to abut the back peripheral face of said insert, thereby providing three point contact for said insert on its forward bottom surface, on its back peripheral face, and on its back upper edge face.

10. A machining tool holder having an elongated shank and an insert-receiving recess on one end thereof; said recess having a bottom support ledge and a back wall portion to receive an indexable tip insert in said recess with a cutting edge overhanging said ledge, and having a rear edge at said wall portion; eccentric, rotatable locking means supported in said shank and projecting up through said ledge to lock the insert against said wall portion in said recess; and said shank having a projection protruding from said wall portion to be in hold-down relation with the rear of said tip insert, to limit rotation of the tip insert with respect to said wall portion.

11. A machining tool holder having an elongated shank and an insert-receiving recess on one end thereof; said recess having a bottom support ledge and a back wall portion to receive an indexable tip insert in said recess with a cutting edge overhanging said ledge and having its rear portion at said wall portion; said ledge having a positive rake angle; an eccentric, rotatable, insert locking means supported in said shank and projecting up through said ledge to lock the insert against said wall portion in said recess; said shank having a projection protruding from said wall portion to be in hold-down relation over the top of the rear portion of the tip insert; a cut-out relief beneath said projection to receive the adjacent upper peripheral cutting edge of the insert; and a shoulder along the lower edge of said relief to abut the back peripheral face of the insert.

No references cited.

WILLIAM W. DYER, JR., *Primary Examiner.*

HARRISON HINSON, *Examiner.*